United States Patent [19]

Volk, Jr. et al.

[11] Patent Number: 4,543,835

[45] Date of Patent: Oct. 1, 1985

[54] DRY FLOW SENSOR WITH A LINEAR FORCE TRANSDUCER

[75] Inventors: Joseph A. Volk, Jr., Florissant; Joseph A. Volk, Chesterfield, both of Mo.

[73] Assignee: Beta II, Incorporated, St. Louis, Mo.

[21] Appl. No.: 479,252

[22] Filed: Mar. 28, 1983

[51] Int. Cl.⁴ .............................. G01F 1/30; G01L 1/08
[52] U.S. Cl. ............................... 73/861.73; 73/862.61
[58] Field of Search ........... 73/861.71, 861.72, 861.73, 73/861.74, 862.61, 517 B, 701, 861.01, 861.02, 195; 222/55

[56] References Cited

U.S. PATENT DOCUMENTS

| | | | |
|---|---|---|---|
| 2,571,863 | 10/1951 | Godsey | 73/861.71 X |
| 2,605,638 | 8/1952 | Pearson | 73/861.72 |
| 3,138,955 | 6/1964 | Uttley | 73/861.72 |
| 3,372,579 | 3/1968 | Hobel et al. | 73/862.61 |
| 3,530,714 | 9/1970 | Akeley | 73/861.75 |
| 3,640,135 | 2/1972 | Tomiyasu et al. | 73/861.73 |
| 3,680,357 | 8/1972 | Clusener | 374/56 |
| 4,063,456 | 12/1977 | Jonkers | 73/861.73 |
| 4,067,238 | 1/1978 | Oetiker | 73/861.73 |
| 4,238,956 | 12/1980 | Sniezek et al. | 73/861.01 |
| 4,440,029 | 4/1984 | Tomiyasu et al. | 73/861.73 |

FOREIGN PATENT DOCUMENTS

| | | | |
|---|---|---|---|
| 2950925 | 11/1980 | Fed. Rep. of Germany | 73/861.73 |
| 723375 | 4/1980 | U.S.S.R. | 73/861.73 |

Primary Examiner—James L. Rowland
Assistant Examiner—Brian R. Tumm
Attorney, Agent, or Firm—Rogers, Howell, Renner, Moore & Haferkamp

[57] ABSTRACT

A linear force transducer includes an inclined plate mounted in a chute to be impacted by a flow of granular material, the plate being supported by one or more leaf springs from the chute. An actuator rod is mounted to the plate and extends to a servo mechanism which generates a force to resist deflection of the plate, the actuator rod being supported by a pair of spaced leaf springs. The servo mechanism includes an electromagnetic force generator to apply a force to the actuator rod, with an electronic circuit to produce an electrical current in response to a force applied to the inclined plate to energize the electromagnetic force generator.

58 Claims, 31 Drawing Figures

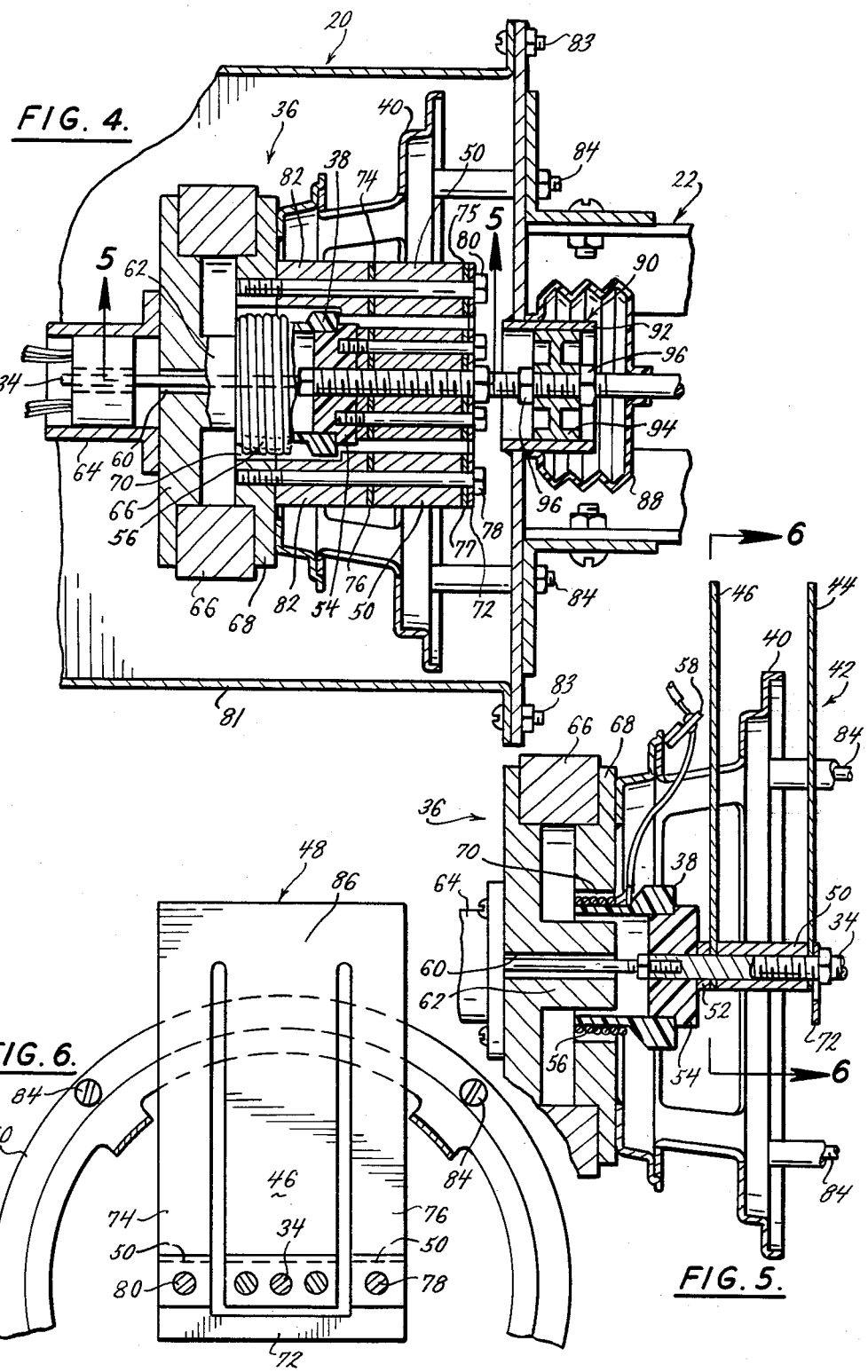

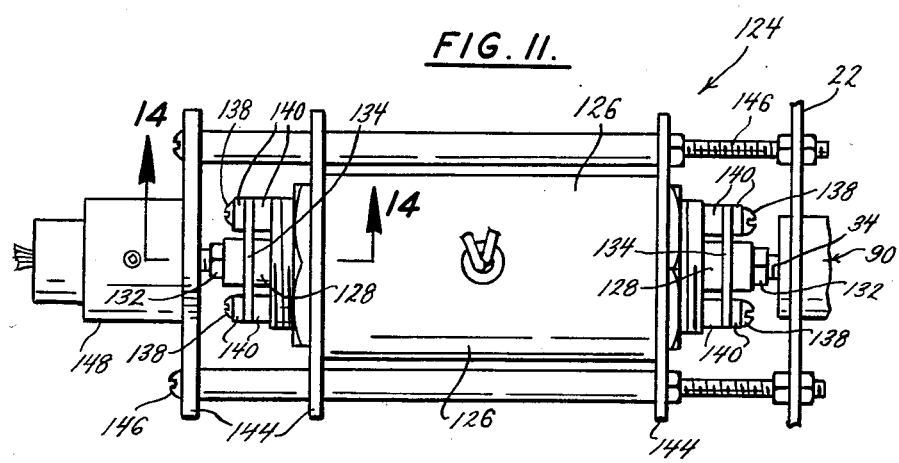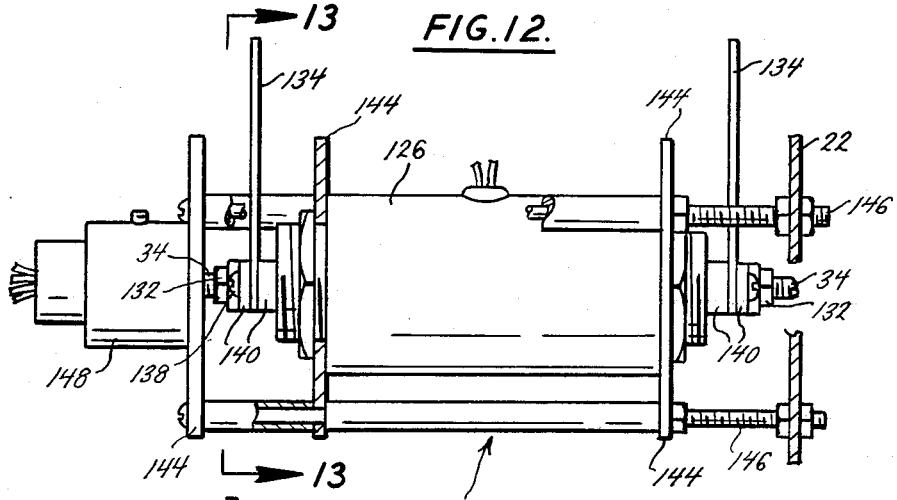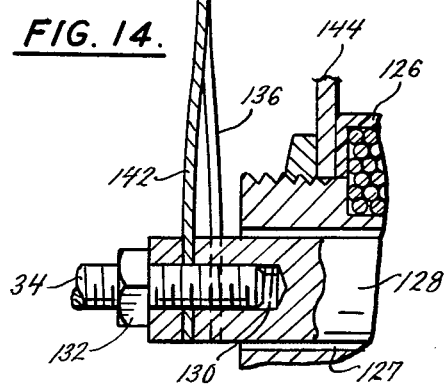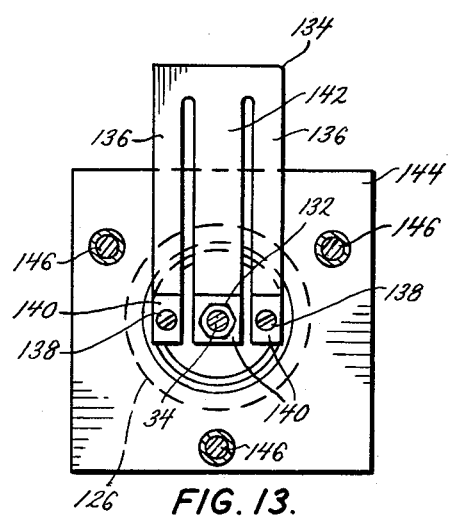

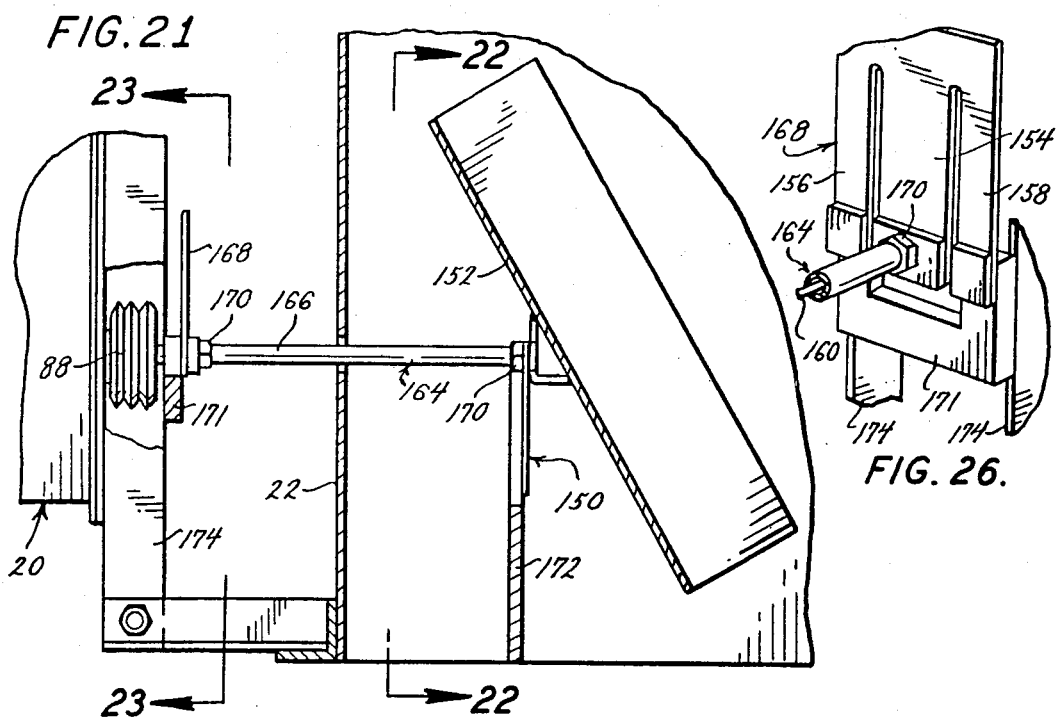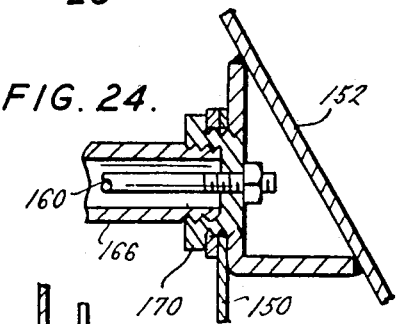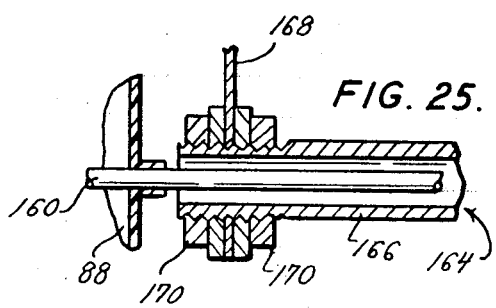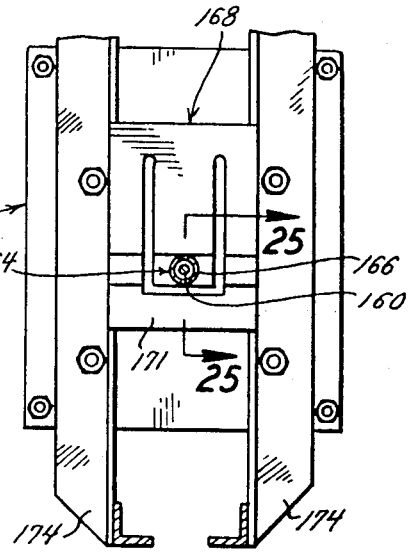

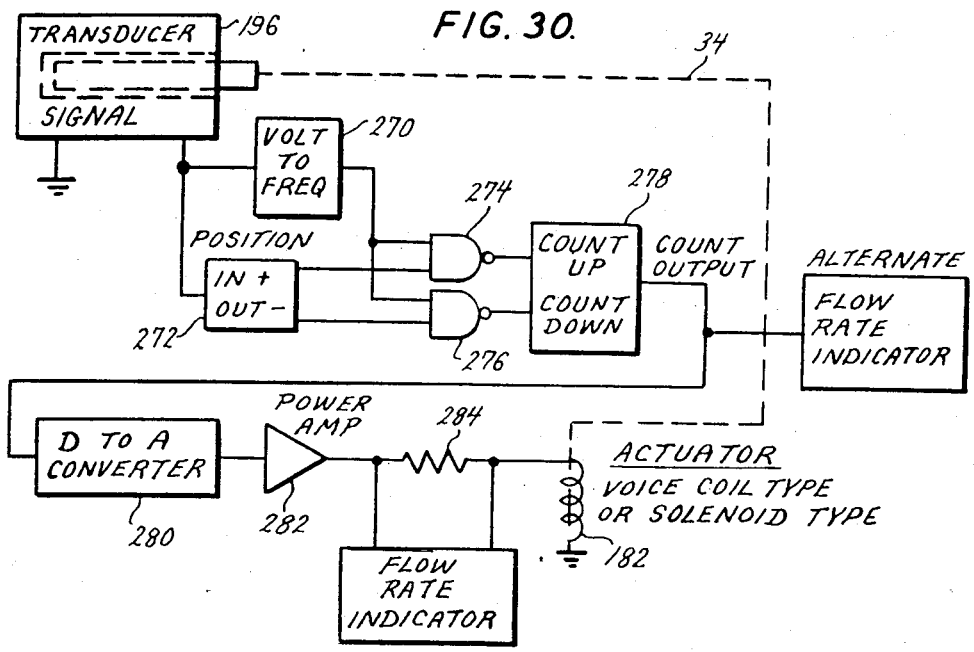
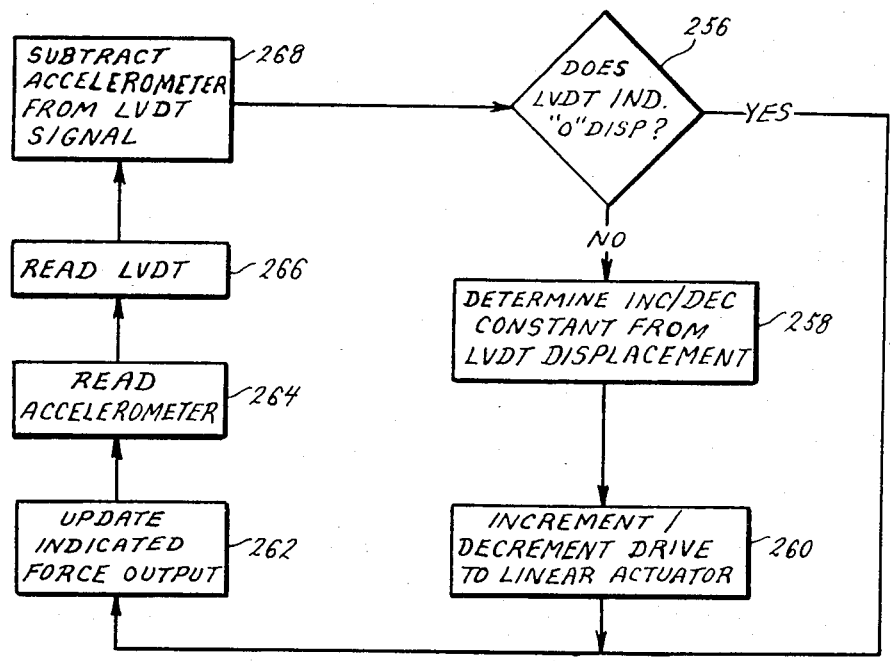
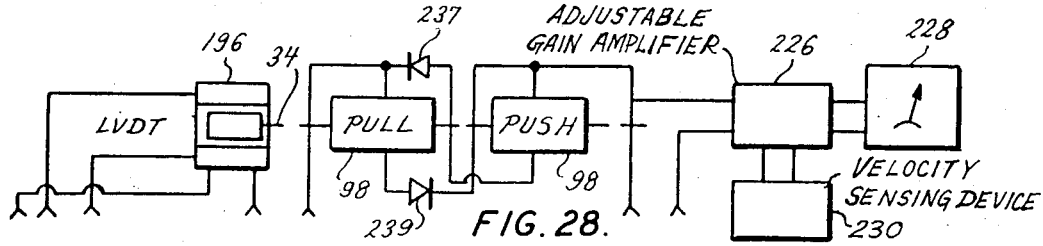

DRY FLOW SENSOR WITH A LINEAR FORCE TRANSDUCER

BACKGROUND AND SUMMARY

Devices for measuring the flow rates of powdery and granular materials as they flow through a gravity flow system are well known in the art. The inventors herein are also the inventors of U.S. Pat. No. 4,069,709 which disclosed such a device. Another dry flow sensor device is also disclosed in U.S. Pat. No. 3,640,135. These patents disclose devices which generally include an inclined plate which is placed in the flow path of the material to be metered. A mechanical spring means of some sort is used to resist movement of the plate, and a transducer is mechanically coupled to the plate to produce an electronic signal proportional to plate deflection which may be amplified and displayed to provide a measurement of the sensed rate of flow of the material. As can be appreciated, each of these prior art systems require deflection of the plate to produce a measurement of the flow rate. Also, a mechanical spring action resists movement of the plate such that the resisting force is linearly related to the magnitude of plate deflection. Furthermore, these systems are "open loop" systems in the sense that there is no feedback which compares the measured flow rate with the position of the plate to correct for errors in measurement. Instead, the linear deflection is measured by a transducer and translated into a flow rate.

As the plate in these devices must deflect to obtain a reading, and mechanical springs are used to resist that deflection, the mechanical springs are subject to taking on a "set" or zero position which varies from their initial configuration. This "set" results in a shifting of the zero or null position for the flow rate sensor, and an error in the indicated flow rate. Furthermore, as Hook's law governs the resistive force of a spring, i.e., F=distance X spring constant, a linear relationship exists between the deflection of the plate and the resisting force. Also, the frictional losses in the system, including the spring, are greater for greater travels of the plate. Therefore, there is a Hobson's choice between a spring having a greater spring constant which provides less deflection and hence less accuracy in the measurement of the flow rate, and a spring having a smaller spring constant providing greater deflection and greater accuracy, but with greater chance of zero shift and frictional losses in the spring and system. These factors have greatly limited the available accuracy for flow rate sensors of this design in the prior art.

Still another problem with the prior art devices was the tendency for them to clog with material. As the amount of deflection of the plate is generally small, and its movement is dampened, material has a tendency to gather on and around the plate which throws off the accuracy of the sensor, and could also clog the chute. As the sensors were commonly mounted in chutes which might be a substantial distance above a floor, the dry flow sensor would fall into disuse merely from a neglect to adequately clean the device.

To solve these and other problems, the inventors herein have succeeded in developing a linear force transducer and suspension system therefor which is adaptable to the dry flow sensor application, among others. The transducer includes a unique leaf spring suspension to support an actuator rod extending to the plate with a servo mechanism connected to the actuator rod to resist deflection of the plate (in several embodiments eliminating deflection) and an indicator which displays the magnitude of the generated restoring force as an indication of the applied force, and hence the flow rate sensed by the plate. As a servo mechanism is used, there is closed loop feedback which significantly improves the accuracy of the flow rate sensor. As noted above, the prior art device merely displays the indicated flow rate. With the present invention, the indicated flow rate is a direct measure of the restoring force needed to balance the forces on the plate. If the restoring force is greater than the applied force, an imbalance occurs which lessens the restoring force through action of the servo. Thus, a feedback loop is provided which ensures that the restoring force exactly matches the applied force to much more accurately measure the applied force, and hence the flow rate.

Disclosed herein are three embodiments of a servo system. One may generally be referred to as the "speaker" design as it incorporates the structure from a conventional loudspeaker. The cone of the speaker is cut away from the surrounding frame, and the actuator rod is secured to the voice coil such that current through the voice coil produces the restoring force. The voice coil is supported by and is free to move with the actuator rod which is itself suspended by the suspension system. A second design, or "solenoid" design, incorporates a pair of solenoids which are connected in opposition to each other and to the actuator rod such that an imbalance between the coil currents produces a net force on the actuator rod. Still a third design is the "magnetic spring" design which can be used with lower flow rates producing lower forces on the plate. It includes an electromagnetic coil having a cylindrical opening through its center, with a soft iron core extending therethrough which is secured to the actuator rod. Thus, current through the coil produces an electromagnetic force along the axis of the iron core which resists the force applied to the plate.

In addition to these several embodiments of the servo, there is disclosed herein several embodiments of electronic circuits for measuring and amplifying the applied force, generating a restorative force, and energizing the servos. One such circuit is the "electronic spring" circuit which measures the deflection of the actuator rod to produce an input to an amplifier circuit, the amplifier circuit output being used to energize the servo. In this circuit, a minimal deflection of the plate, actuator rod, and transducer is required to achieve amplifier output. In a second or "true servo" circuit, deflection of the plate and actuator rod is sensed and a resistive force generated forcing the plate and actuator rod to their zero or null positions. Unlike the "electronic spring" circuit, this circuit requires only an initial, instantaneous deflection of the plate to achieve an amplifier output, and the plate is returned to its null position. Actually, the circuit is designed with very fast response times to maintain the actuator rod and plate essentially at their zero or null positions by integrating the applied force and applying it to the plate. In a third circuit, a programmed microprocessor provides great versatility in processing the applied force signal and generating the restorative force. This results in the plate being more closely maintained in its zero or null position during rapid changes of flow rate, and, hence, rapid changes of forces impinging on the plate. By being fully programmable, the microprocessor circuit permits the transducer to be adapted for a wide range of materials and operating conditions, and a selection of various parameters to optimize performance.

Each of these electronic restorative force generating circuits include features which enhance the operation of the linear force transducer in a dry flow sensor application. For example, a "dithering" voltage, or full wave rectified, un-filtered A-C is applied to the servo to set up a minute oscillation of the plate to overcome the mechanical state friction of the plate and its suspension so that any minimal applied force will deflect it. Still another part of the circuit occasionally applies an oscillating current of sufficient magnitude and frequency to the servo to heavily "shake" the plate and knock off any accumulated material. This effectively cleans it and prevents clogging of the chute in which the plate is mounted. A velocity sensing device may be placed in the chute to detect the velocity of the falling granular material, and its output used to adjust the indicated flow rate up or down for material having different particle sizes. Also, an accelerometer may be mounted on the chute, in line with the actuator rod's axis, to detect vibrations of the chute. These vibrations may then be subtracted from the measured applied force.

Still another feature of the invention is the unique suspension which substantially limits the movement of the actuator rod to a linear motion and which is virtually frictionless in that there are no sliding bearing members. Generally, the suspension includes a pair of spaced, multiple-leaf springs, each spring having three leaves of equal length. The center leaf is twice as wide as the outer leaves, and the center leaf of each spring is connected to the actuator rod with the outer leaves connected to the supporting structure. Thus, as the actuator rod moves, the leaves of the springs separate equally about a centerline drawn through the hinge point joining the tops of the leaves. Furthermore, as the leaves separate, the hinge point migrates towards the actuator rod which ensures that the actuator rod moves linearly along its axis, and not arcuately around the hinge. Each leaf spring may be constructed of a one piece spring element, or assembled from various components having greater or lesser degrees of resiliency. In addition to the actuator rod, this same suspension system may be used to mount the plate, or force sensing surface against which the flow of material impacts. This virtually frictionless suspension also serves to strictly limit the movement of the deflector plate to a linear motion which can be aligned with the actuator rod to ensure a correct transmission of the applied force.

With the dry flow sensor of the present invention, measurements may be taken which approach 0.1% accuracy in the indicated flow rate, where devices of the prior art were only capable of 5% accuracy. This increased accuracy is very important in the weighing and loading of dry materials both in processing applications, and in packaging or packing applications.

BRIEF DESCRIPTION OF THE DRAWINGS

FIG. 4 is a cross sectional view taken along the plane of line 4—4 in FIG. 2 and detailing the internal construction of the speaker type sensor;

FIG. 5 is a partial cross sectional view taken along the plane of line 5—5 in FIG. 4 and further detailing the internal construction of the speaker type sensor;

FIG. 6 is a view taken along the plane of line 6—6 in FIG. 5 showing the orientation of one leaf spring with respect to the sensor;

FIG. 11 is a plan view of the magnetic spring embodiment;

FIG. 12 is a side view of the magnetic spring embodiment;

FIG. 13 is a view taken along the plane of line 13—13 in FIG. 12 showing the leaf spring mounting in the magnetic spring embodiment;

FIG. 14 is a partial cross sectional view taken along the plane of line 14—14 in FIG. 11 detailing the deflection of a leaf spring in the magnetic spring embodiment;

FIG. 21 is a partial cross sectional view of a plate supported in a chute by a single leaf spring;

FIG. 22 is a view taken along the plane of line 22—22 in FIG. 21 showing the outboard leaf spring supporting a portion of the actuator rod with beam stiffener;

FIG. 23 is a view taken along the plane of line 23—23 in FIG. 21 and further detailing the single leaf spring mounting of the plate;

FIG. 24 is a partial cross sectional view taken along the plane of 24—24 in FIG. 22 and detailing the beam stiffener and actuator rod mounting;

FIG. 25 is a partial cross sectional view taken along the plane of line 25—25 in FIG. 23 and detailing the beam stiffener and actuator rod configuration;

FIG. 26 is a partial perspective view of the leaf spring depicted in FIG. 23 and detailing its mounting;

FIG. 28 is a partial schematic of a modification to the circuit of FIG. 27 for the double solenoid embodiment;

FIG. 30 is the block diagram circuit for the digitized servo control circuit;

FIG. 31 is a flow chart for the operation of the microprocessor system shown in FIG. 29.

DETAILED DESCRIPTION OF THE PREFERRED EMBODIMENT

Figure 1:
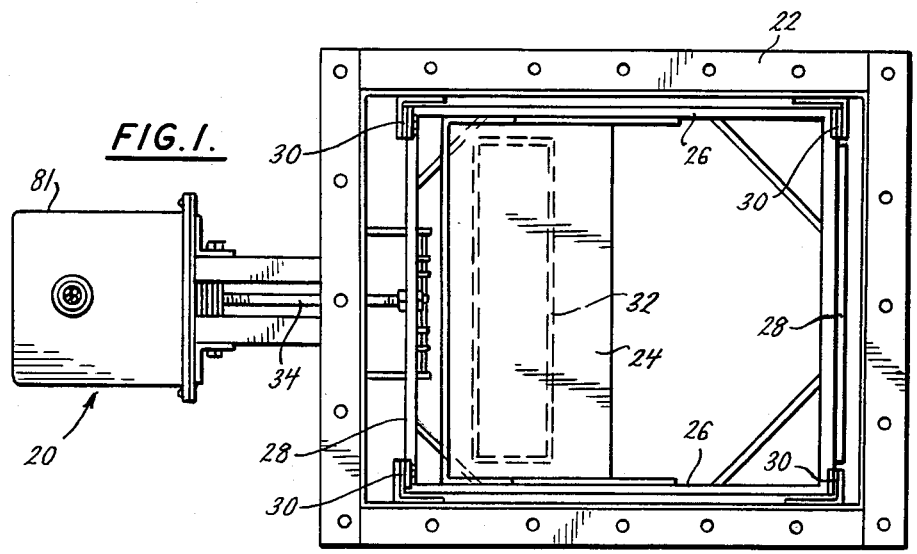
FIG. 1 is a plan view of the dry flow sensor mounted to a chute.
Figure 2:
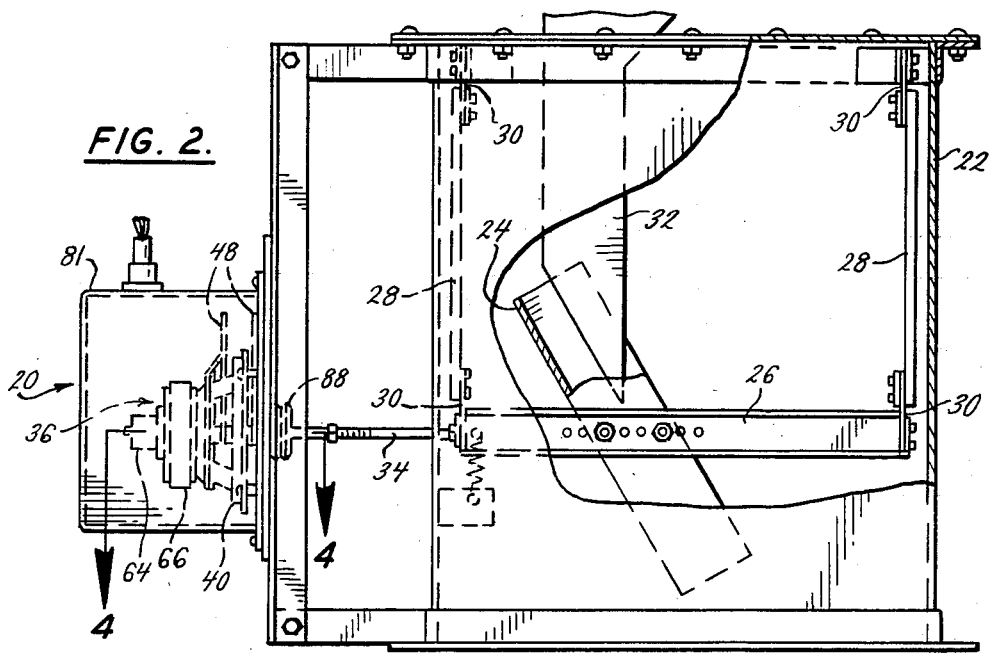
FIG. 2 is a side view of the dry flow sensor shown in FIG. 1 partially broken away to detail the mounting of the plate.
Figure 3:
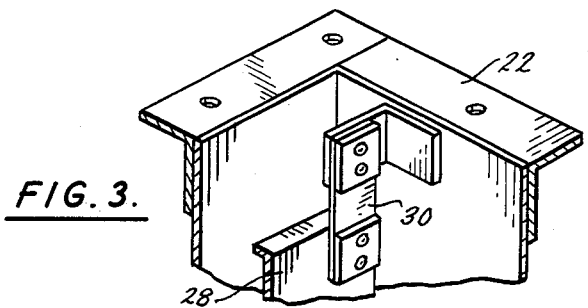
FIG. 3 is an enlarged partial view of the hanger springs mounting the carriage for the plate.

The linear force transducer 20 of the present invention may be physically disposed in a chute 22, as shown in FIGS. 1 and 2 to operate as a dry flow sensor and sense the rate of flow of granular material through the chute 22, much as the device disclosed in U.S. Pat. No. 4,069,709, incorporated herein by reference. Essentially, the linear force transducer 20 includes a plate 24 which is bolted to a framework of brackets 26, the framework 26 being itself supported by a pair of trapezoidal brackets 28 with individual strap springs 30 (as best shown in FIG. 3), mounting between the trapezoidal brackets 28, the framework 26, and the chute 22 itself. A downwardly depending spout 32 guides the flow of granular material through chute 22 and onto plate 24, and ensures that all of the material impinges upon plate 24 before continuing its downward flow. Thus, plate 24, as supported by framework and brackets 26, 28 as connected by springs 30, is free to deflect to the left as viewed in FIG. 2 in response to a flow of material impinging on plate 24. An actuator rod 34 is connected to the square framework 26 and extends to the left to connect to the linear force transducer 20 to transmit the deflection of the plate 24 in response to a flow of material through the chute 22 and spout 32. This describes the general physical arrangement of the present state of the art dry flow sensors, as might be connected to one of the embodiments of applicant's linear force transducer 20 disclosed herein.

As shown in FIG. 2, the "speaker design" 36 transducer is shown in phantom outline and appears in greater detail in FIGS. 4 to 6. This "speaker design" 36 will now be described in greater detail. The speaker design 36 may be constructed from a conventional loudspeaker by cutting away the voice coil 38 from the supporting framework 40 and connecting the suspension 42 as will be described herein. As best shown in FIG. 5, actuator rod 34 is bolted to the center leaves 44, 46 of a pair of leaf springs such as leaf spring 48 shown in FIG. 6. A pair of spacers 50, 52 surround actuator rod 34 with spacer 50 extending between center leaves 44, 46, and second spacer 52 extending between center leaf 46 and a plastic cap 54 secured to voice coil 38. Of course, voice coil 38 has multiple turns of wire 56, the ends of which are brought out to a terminal board 58, as known in the art. Actuator rod 34 extends through a cylindrical hole 60 drilled through the core 62 of the speaker, with the actuator rod 34 providing the movable armature to operate a small electromagnetic transducer 64 such as Trans Tec 342-000 which produces a variable voltage output in response to the movement of actuator rod 34 therein. The speaker core 62 is made of a soft ferrous material, such as iron, and includes a permanent magnet 66 and a pole piece 68 to create the magnetic air gap 70 necessary to deflect voice coil 38, as is known in the art. A C-shaped brace 72 may be mounted between the outer leaves 74, 76, as shown in FIG. 6, to provide increased lateral stability between the leaves of leaf spring 48. As shown in FIG. 4, each outer leaf 74, 75, 76, 77 is itself mounted to pole piece 68 by threaded bolts 78, 80 and spacers 82. Thus, the center leaves 44, 46 are free to move with actuator rod 34 in response to movement of plate 24 while the outer leaves 74, 75, 76, 77 are firmly fixed by bolts 78, 80 to pole piece 68 which is in turn connected to speaker frame 40, speaker frame 40 being bolted to the side wall of chute 22 by bolts 84. An enclosure 81 surrounds speaker design 36 and is bolted to chute 22 with bolts 83.

As shown in FIG. 6, the construction of each leaf spring 48 is such that the effective spring length of each leaf, 46, 74, 76 is the same; and, furthermore, the width of the outside leaves 74, 76 is each one-half of the width of the center leaf 46. Thus, there is the same effective width and length of spring connecting the actuator rod 34 to the hinge portion 86, and between the hinge portion 86 and the fixed mounting of bolts 78, 80. Therefore, as each leaf spring 48 is deflected, the hinge portion 86 remains half way between leaves 74, 76 and center leaf 46, when viewed from the side, as shown in FIG. 14. Also, hinge portion 86 migrates towards actuator rod 34 which ensures that actuator rod 34 moves in a substantially linear fashion to maintain its alignment.

As best shown in FIG. 4, a dust seal 88 may be provided between actuator rod 34 and the side-wall of chute 22 to prevent the entry of dust. An explosion proof seal 90 as is shown in FIG. 4 may also be provided which meets NEMA standards for explosion proof enclosures for those applications where hazardous conditions may exist. This explosion proof seal 90 may be an air-less dashpot such as Air Pot #S325P145X295. It generally includes a cylindrical outer body 92 with an internal bellows member 94 which is machined to fit almost perfectly within the cylindrical outer body 92 and provide very little or no friction therebetween. As shown in FIG. 4, actuator rod 34 may be fastened by nuts 96, or the like along a threaded portion thereof to secure it to bellows member 94. As will be more fully explained hereinafter, as actuator rod 34 moves to the left in response to a force applied to plate 24, a voltage is induced in transducer 64 which is amplified and applied to the wire 56 on voice coil 38 to induce an electromagnetic force to thereby resist the force and return the plate 24 substantially to its original position.

Figure 7:
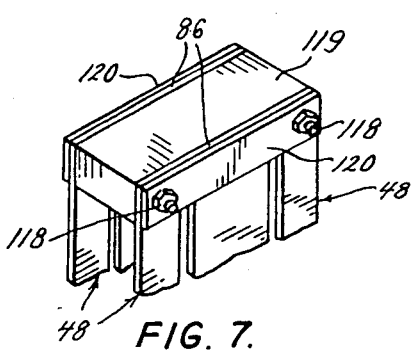
FIG. 7 is a partial perspective of a modification to the leaf spring suspension.

To increase the lateral stability of leaf springs 48 and coordinate their movement, they may be mechanically coupled together along the hinge portion 86, as is best shown in FIG. 7. As depicted therein, a pair of bolt assemblies 118 fixedly mount a spacer block 119 between springs 48 with mounting bars 120 sandwiching hinge portion 86 therebetween. As each leaf spring 48 moves exactly like the other, there should be no distortion created by this mechanical coupling, and it helps minimize any which might otherwise be caused by any relative mis-alignment.

Figure 8:
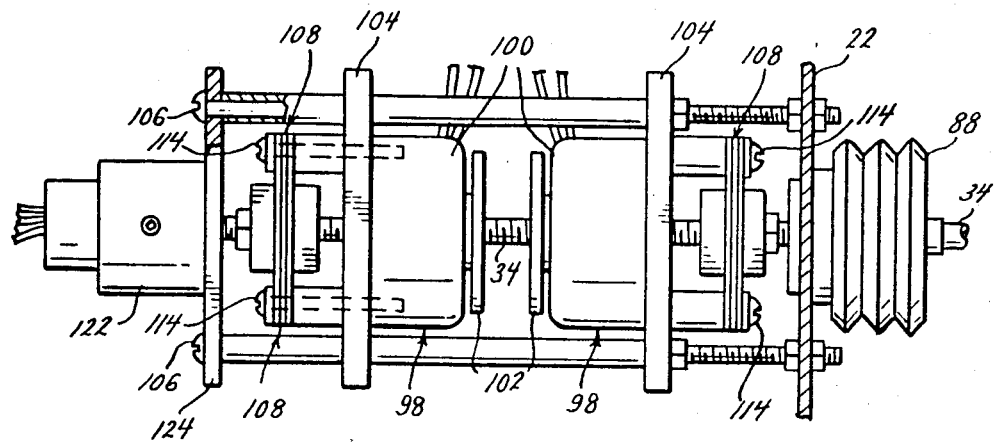
FIG. 8 is a plan view of the double solenoid embodiment.
Figure 9:
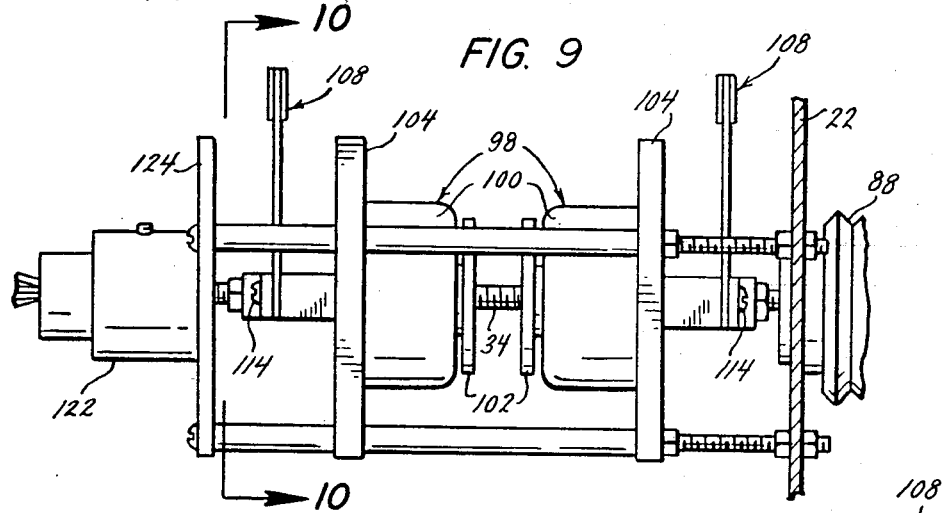
FIG. 9 is a side view of the double solenoid embodiment.
Figure 10:
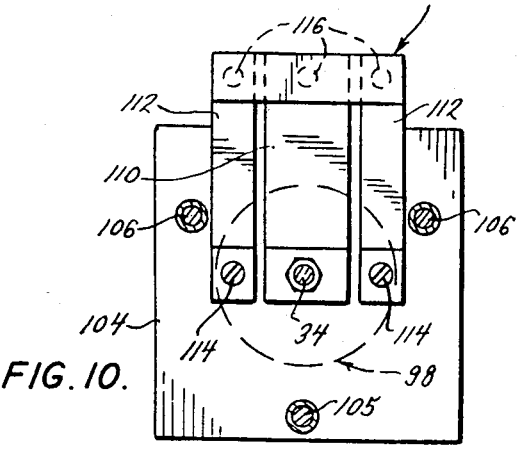
FIG. 10 is a view taken along the plane of line 10—10 in FIG. 9 depicting the leaf spring mounting.

The "solenoid design" is best shown in FIGS. 8 to 10 and includes a pair of Ledex solenoids 98 which may be catalog No. 129415-024, each of which has a coil 100 and an armature 102. A pair of mounting plates 104 mount the solenoids 98 and bolt assemblies 106 mount the mounting plates 104 in a fixed spatial relationship with respect to each other and the chute sidewall 22. The actuator rod 34 is supported by a pair of leaf springs 108 mounted on opposite sides of mounting plates 104; each leaf spring 108 having its center leaf 110 connected to the actuator rod 34 and its outer leaves 112 connected to mounting plate 104 by bolt assemblies 114. An alternate construction for leaf spring 108 is best shown in FIGS. 9 and 10 wherein separate leaf members are held together by spot welds 116. As in the speaker design 36, an electromagnetic transducer 122 is mounted to a mounting plate 124, and is operated by the end of actuator rod 34. As is apparent, the net resultant force on armatures 102 is determined by the relative difference in forces generated by coils 100. Upon movement of actuator rod 34, an imbalance in forces is generated which presents a net effective force on actuator rod 34 to resist the deflection of plate 24.

The "magnetic coil" design is best shown in FIGS. 11 to 14 and includes a single coil 126 having a cylindrical hole 127 extending along its central axis with a soft iron core member 128 extending therethrough and connected to actuator rod 34 with a threaded opening 130 and lock nut 132, as best shown in FIG. 14. A pair of spaced leaf springs 134 support the actuator rod 34 and iron core 128, much as in the other designs heretofore described. In each leaf spring 134, outer leaves 136 are screwed to the end of coil 126 by threaded screws 138 and spacers 140. The center leaf 142 is connected to iron core 128 and actuator rod 34 by nut 132, as shown in FIG. 14. As in other embodiments, mounting plates 144 and bolt assemblies 146 maintain the overall configuration of the iron core 128 and coil 126 with respect to the chute 22. Also, a transducer 148 is operated by the end of actuator rod 34, as previously described.

Figure 15:
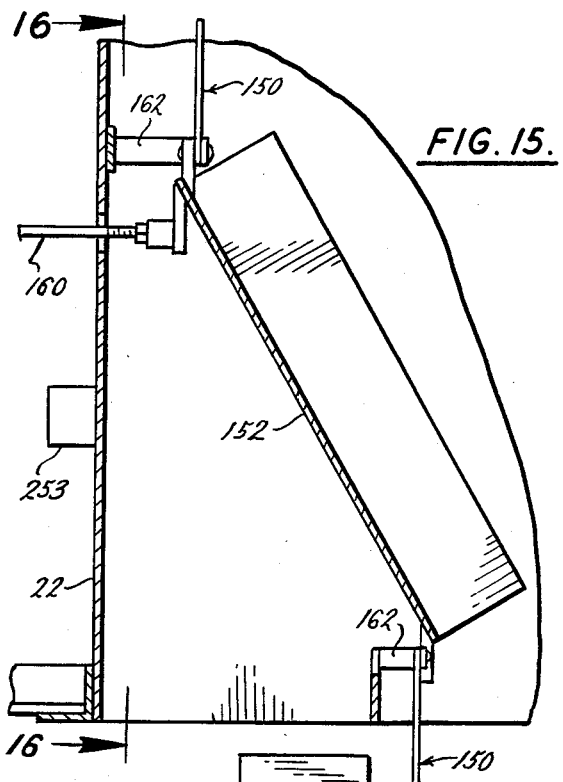
FIG. 15 is a partial cross sectional view of a plate supported in a chute by a leaf spring suspension.
Figure 17:
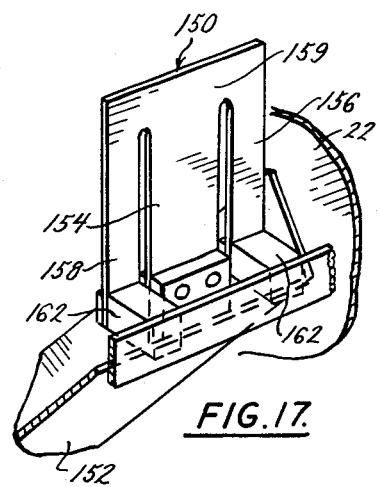
FIG. 17 is an enlarged partial view of one leaf spring and its mounting between the plate and support.
Figure 16:
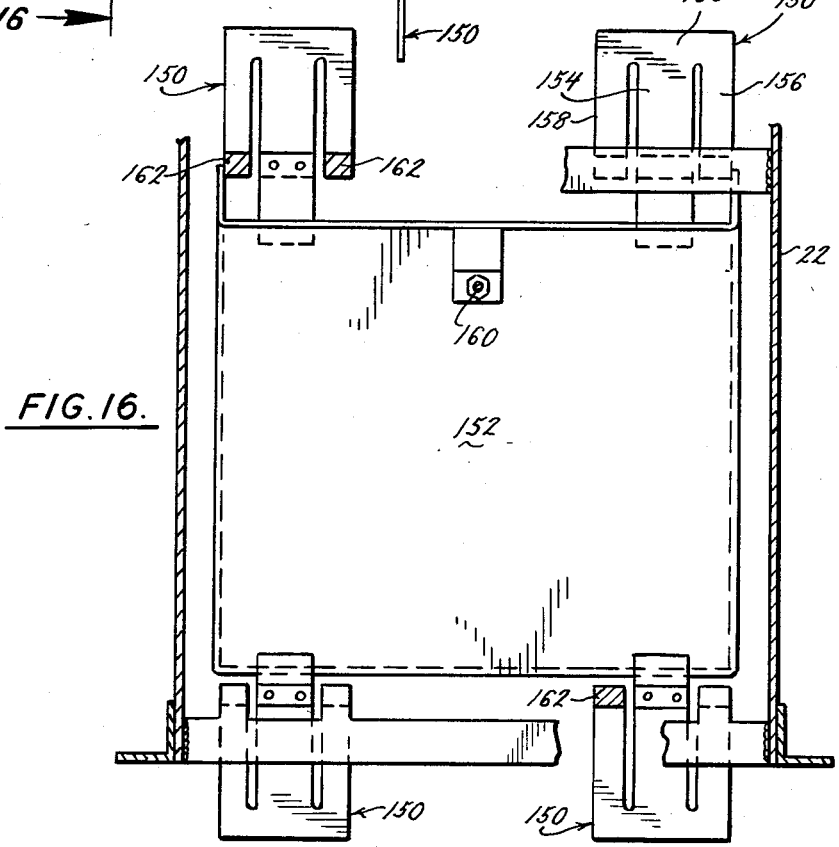
FIG. 16 is a front view taken along the plane of line 16—16 in FIG. 15 and further showing the leaf spring suspension supporting the plate.

As shown in FIGS. 15 to 26, one or more leaf springs 150 may be used to mount the plate 152 instead of the conventional mounting assembly as described in connection with FIGS. 1 to 3. A leaf spring suspension utilizing leaf springs 150 for plate 152 results in a truly linear motion for plate 152, instead of the arcuate swinging motion of the prior art, because of the design of leaf springs 150. This design includes a center leaf 154 which is twice as wide as either outer leaf 156, 158, and with an overall spring length of each leaf 154, 156, 158 being the same. A hinge portion 159 connecting the top of the leaves 154, 156, 158 may also be substantially the same width as each outer leaf 156, 158, which further ensures true linear movement between the leaves as they are deflected with respect to each other. A first such arrangement is shown in FIGS. 15 to 17 and includes four leaf springs 150, each spring mounting a corner of a substantially rectangular plate 152. The actuator rod 160 is separately connected to the plate 152. At each position, the center leaf 154 is connected to the plate member 152 and the outer leaves 156, 158 are connected to support brackets 162.

Figure 18:
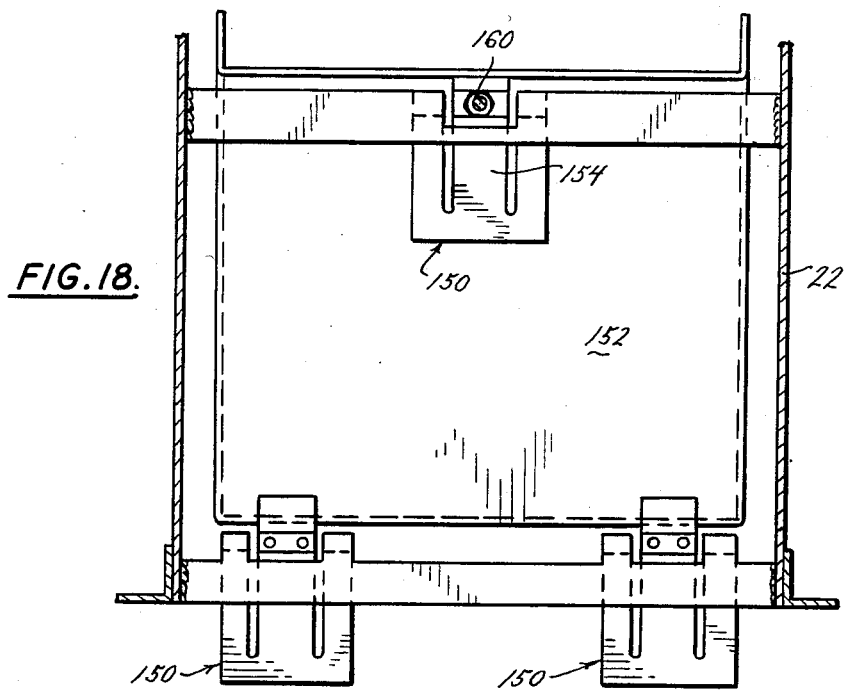
FIG. 18 is a front view of a plate supported in a chute by three leaf springs.

A second arrangement is shown in FIG. 18 and includes three leaf springs 150, with actuator rod 160 connected to the center leaf 154 of the upper leaf spring 150.

Figure 20:
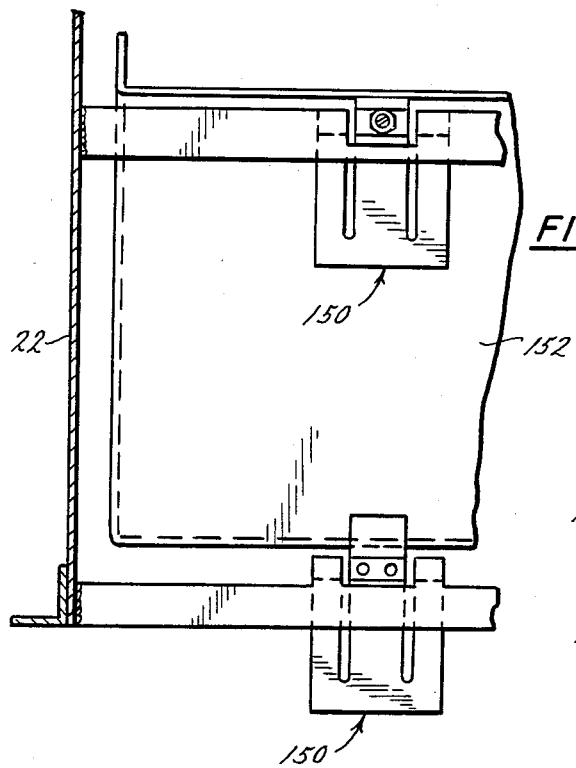
FIG. 20 is a partial view of a plate supported in a chute by two leaf springs.
Figure 19:
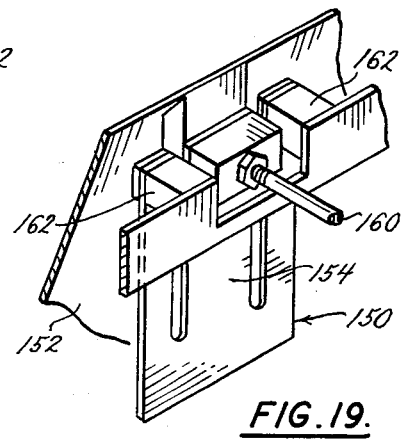
FIG. 19 is an enlarged partial view of the top leaf spring as shown in FIG. 18 and detailing the actuator rod connection.

Still a third arrangement is shown in FIGS. 19 and 20 and includes only two leaf springs 150, each leaf spring being mounted near the middle of the top or bottom of plate 152. FIG. 19 shows in greater detail the actuator rod 160 mounting to the center leaf 154 at the top of plate 152. As discussed previously, it matters not whether actuator rod 160 is connected to the center of the plate 152, as the movement of the plate 152 is controlled by the leaf springs 150 to be substantially linear.

As shown in FIGS. 21 to 26, a single leaf spring may be used to support the plate 152, with the addition of a beam stiffener 164 in the form of a hollow threaded tube 166 which extends between leaf spring 150 and a leaf spring 168 which is spaced closer to the linear force transducer 20. As shown in FIGS. 24 and 25, the hollow threaded tube 166 is connected at either end with nuts 170, the tube member 166 being fixed with respect to actuator rod 160 at the plate 152. However, the actuator rod 160 extends through the other end of tube member 166 and is supported at its other end by one of the various embodiments of the linear force transducer 20 described above. Leaf spring 168 may be reinforced with a lower C-brace 171 as shown in FIG. 26 which extends between the outer leaves 156, 158. This helps to maintain the lateral stability of the leaf spring 168 during operation. Leaf spring 150 is shown mounted to a bracket member 172 in FIG. 22, which is itself mounted to the side wall of chute 22. Leaf spring 168 is shown mounted in FIG. 23 between a pair of alignment brackets 174 which permit adjustment thereof.

Figure 27:
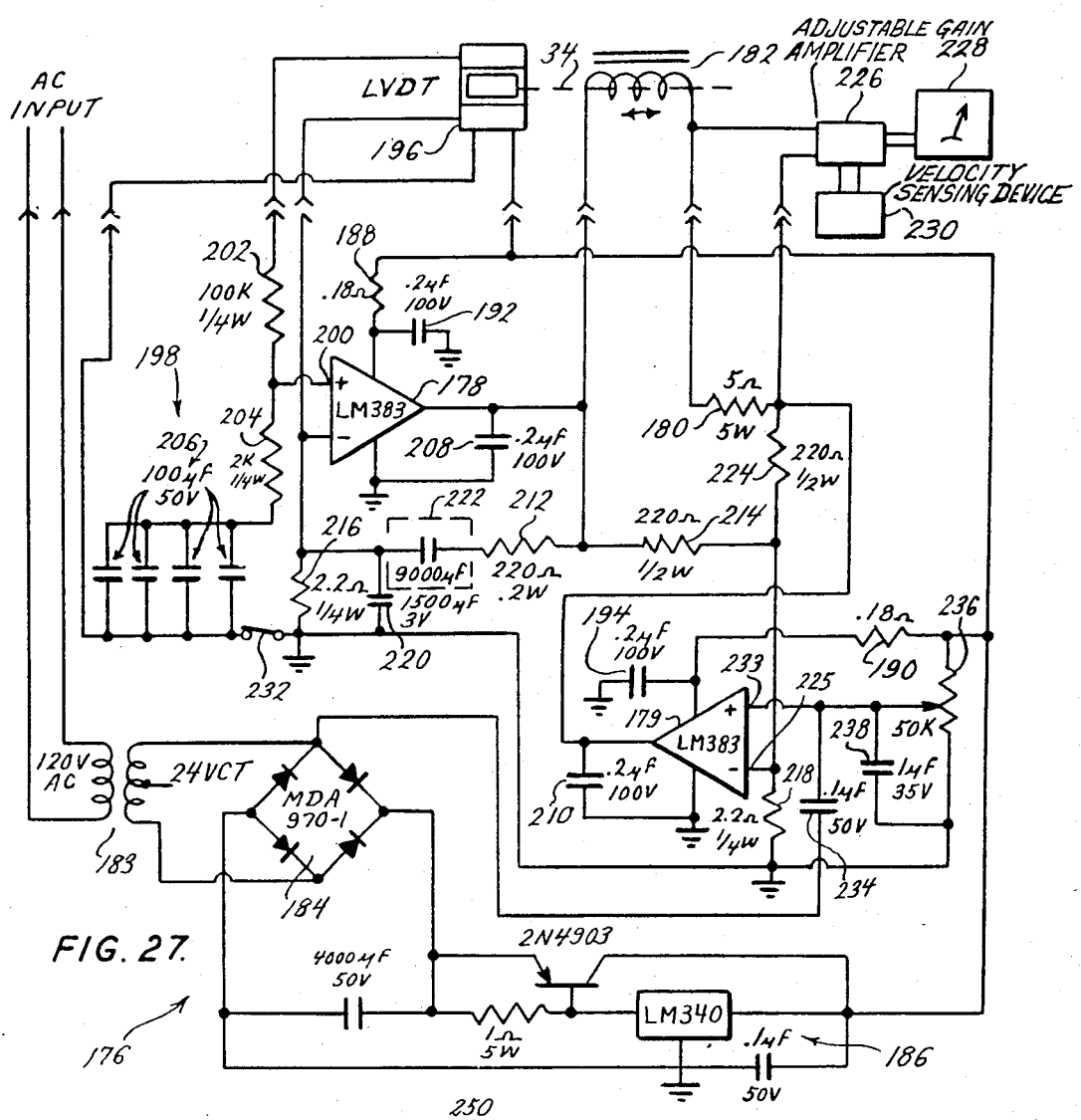
FIG. 27 is an electrical schematic of the dry flow sensor force generating circuit.

An electronic restoring force generating circuit 176 is shown in FIG. 27 which electronically generates the electrical signal required to energize one of the various electromagnetic force generators, or servos, described above to resist deflection of the plate 24. The electronic circuit 176 is essentially a bridge amplifier circuit and includes a pair of differential amplifiers 178 such as type number LM383, with a 5 ohm resistor 180 and, as shown in FIG. 27, an electromagnetic driver coil 182 with a nominal 4 ohm resistance connected in series between their outputs. A transformer 183 steps down the AC input voltage and feeds it to a full wave bridge rectifier 184, the output of which is supplied to a DC voltage regulator circuit 186, as known in the art. The output from the DC regulator 186 is connected through a pair of 0.18 ohm resistors 188, 190 and a pair of 0.2 microfarad capacitors 192, 194 to differential amplifiers 178, 179. These circuits decouple the AC component remaining in the output of the DC voltage regulator 186. A linear voltage transducer 196, or LVDT, is mechanically coupled through an actuator rod 34 to electromagnetic coil 182, as was mentioned previously with respect to each of the several servo embodiments discussed above. The LVDT transducer 196 provides a voltage output across an input circuit generally designated as 198 to the positive input 200 of the left side differential amplifier 178. The input circuit 198 includes a 100k ohm resistor 202, a 2k ohm resistor 204, and several parallel connected 100 microfarad capacitors 206. The output of each differential amplifier 178, 179 has a 0.2 microfarad decoupling capacitor 208, 210, respectively.

The output of amplifier 178 divides between a pair of 220 ohm resistors 212, 214, and a pair of 2.2 ohm resistors 216, 218. A 4500 microfarad capacitor 220 is connected in parallel with 2.2 ohm resistor 216, and an optional 9000 microfarad capacitor 222 may be provided between resistors 212, 216 when the circuit 176 is operated in an integrating mode to provide true servo action, as will be further explained below. A third 220 ohm resistor 224 is connected between coil 182, 5 ohm resistor 180, and a negative input 225 to amplifier 179. An adjustable gain amplifier 226 monitors the voltage across the 5 ohm resistor 180 and drives an indicating meter 228. A speed monitoring device 230 monitors the speed of the granular material as it falls in chute 22, the output of which is connected to the adjustable gain amplifier 226. A normally closed switch 232 is connected between resistor 204 and capacitors 206 and ground which permits that portion of the input circuit 198 to be disconnected from the input terminal 200 of amplifier 178, as desired. A full wave rectified AC signal from bridge rectifier 184 is connected to the positive input terminal 233 of amplifier 179 through a 0.1 microfarad capacitor 234. A 50k adjustable potentiometer 236 and a 1 microfarad capacitor 238 are used to set the DC and AC reference points for amplifiers 178, 179. As shown in FIG. 28, the electronic restoring force generating circuit 176 may also be connected to the "solenoid" design and used to drive it, with the addition of diodes 237, 239. As shown therein, actuator rod 34 is mechanically coupled to the two Ledex solenoids 98 in place of the electromagnetic coil 182 of the "speaker design" or the "magnetic spring" design as shown in FIG. 27.

OPERATION OF THE CIRCUIT IN FIG. 27

The electronic restoring force generating circuit of FIG. 27, without capacitor 222 connected in circuit, operates as an electronic spring in that it requires some deflection of actuator rod 34, and hence LVDT 196 output to generate an electrical current through coil 182 and provide a restorative force in opposition to the applied force. The output from LVDT 196 is applied to the positive input terminal 200 of differential amplifier 178 across the input circuit 198 including resistor 202, resistor 204, and capacitors 206. Resistor 204 and capacitors 206 provide a damping effect to the input signal, and increase the circuit's stability. The output of amplifier 178 feeds back through resistor 212 to the negative input of amplifier 178 and across resistor 216 to ground. The ratio between resistors 212 and 216 determine the gain, and in the preferred embodiment the gain is selected at approximately 100. Capacitor 220 is connected in parallel with resistor 216 and provides a rate feedback effect for quickly changing outputs. In other words, as the input, and consequently the output, of amplifier 178 rapidly changes in value, the impedance across resistor 216 and capacitor 220 decreases which increases the effective gain of the amplifier circuit to provide a quicker response time in generating a restoring force against an applied force on the plate 24. The output of amplifier 178 is also applied across resistor 214 and resistor 218, and to the negative input of differential amplifier 179. Thus, as the output of amplifier 178 increases, it places a greater voltage to the negative input of amplifier 179, thereby decreasing the output of amplifier 179. The quiescent operating point for both amplifiers 178, 179 is determined by the setting of 50k POT 236 which applies a portion of the DC potential from the DC voltage regulator 186 to the positive input of amplifier 179. Capacitor 238 sets the AC reference point for the system. At the zero or "null" point, the output of each amplifier 178, 179 is balanced so that there is no voltage across 5 ohm resistor 180 and electromagnetic coil 182, which connects the outputs of amplifiers 178, 179. For any change in LVDT 196 output, the output of amplifier 178 increases which causes the negative input of amplifier 179 to go more positive, and hence reduce the output of amplifier 179 to cause a greater voltage difference between outputs of amplifiers 178, 179 and hence, the applied voltage across coil 182 and resistor 180. In a typical circuit, amplifiers 178, 179 might operate between zero and +12 volts, such that amplifier 178 could reach a maximum of 12 volts and amplifier 179 a minimum of zero volts to create a maximum voltage across coil 182 and resistor 180 at 12 volts.

This circuit has also several unique features which add to the operation of the transducer in a dry flow sensor application. For example, an AC dither voltage is applied from the full wave bridge rectifier 184 and through capacitor 234 to the positive input of amplifier 179. This dither voltage input causes a very slight oscillation of coil 182 and, hence, plate 24 which eliminates the tendency of the plate 24 to "stick" in one position and resist movement. This makes the plate 24 much more sensitive to even small applied forces by eliminating the static friction of the mechanical suspension system. Still another feature is the normally closed switch 232. By opening switch 232, the damping portion of input circuit 198 is taken out of the circuit such that the output of LVDT 196 is input directly to the positive terminal 200 of amplifier 178. This causes a loss of circuit stability and widely increasing oscillations at the output of amplifier 178. This drives coil 182 and plate 24 back and forth vigorously. When the transducer is used in a chute in a typical dry flow application, this feature can be used to shake the plate and knock off any accumulation of granular material. The mechanical mounting of the plate 24 inside chute 22 prevents any overtravel of actuator rod 34 and coil 182, and any physical damage to the system.

As noted above, the electronic spring circuit disclosed in FIG. 27 generally requires a deflection, albeit small, of actuator rod 34 and LVDT 196 to produce an output energizing coil 182 and generating a force in opposition to the applied force on the plate 24. However, by adding capacitor 222, the amplifier circuit for amplifier 178 becomes an integrator which produces an output equal to the intergral of the input applied at terminal 200. Thus, there need not be an input applied to terminal 200 to have an appreciable output applied to coil 182. Furthermore, the effect of the integrating circuit is to restore the position of LVDT 196 to a zero or "null" position and hence the plate 24 to a zero or "null" position, as in the microprocessor system disclosed in FIG. 29 and the digital circuit disclosed in FIG. 30. Thus, with integrating capacitor 222, the electronic spring circuit which produces a restoring force only when the plate is deflected and remains so is modified into a "servo" type circuit which, upon an initial deflection, returns the plate to zero and continues to generate a force equal to the applied force.

Still another feature of the circuit of FIG. 27 is the velocity sensing device 230 which actually detects the velocity of the granular material falling within the chute 22, and feeds an adjustment signal to the adjustable gain amplifier 26 which interfaces between the voltage across resistor 180 and the meter 228. It has been noted in experiments conducted with this invention that granular materials having greater velocities will record greater forces, or flow rates, even though the material may be feeding through the chute 22 at the same rates. To compensate for this reading, and obtain a true and accurate output indicative of the flow rate of the material, the velocity of the material flowing through the chute 22 may be measured by an ultrasonic, photolight sensitive, or other suitable velocity sensing device 230 and its output used to adjust the gain of the adjustable gain amplifier 226 and correct for this small amount of variance believed to be caused by a variance in the size of the granular material flowing through the chute 22.

Figure 29:
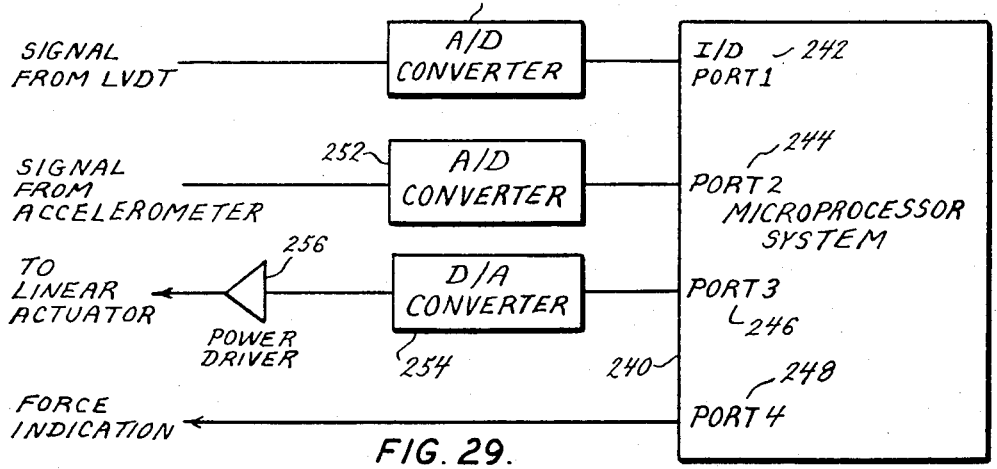
FIG. 29 is a block diagram of the microprocessor system control for the dry flow sensor.

As shown in FIG. 29, a microprocessor system 240 may also be used to electronically generate a restoring force and apply it to one of the various servo designs. A typical microprocessor such as a type number CDP-1802 may be used having four input/output ports 242, 244, 246, 248 for connection to the servo being utilized. I/O port 242 may be interfaced with an analog/digital converter 250 to receive the signal from LVDT 196. I/O port 244 may also be interfaced with an analog/digital converter 252 to receive the signal from an accelerometer 253 (shown in FIG. 15) mounted on the chute 22 and in line with the actuator rod 34 so that the vibrating forces in the chute 22 may be subtracted from the force measured by the system. Alternately, I/O port 244 may be connected with the velocity sensing device 230 through an A/D converter (not shown) to provide the velocity compensation achieved with the circuit of FIG. 27. I/O port 246 is connected through a D/A converter 254 and power driver 256 to output the necessary electronic signal to drive the servo design being utilized, such as the electromagnetic coil 182 of the circuit shown in FIG. 27. I/O port 248 may be connected through any interface circuit (not shown), as required, to drive an indicatig meter such as meter 228 shown in FIG. 27. A flow chart for the software necessary to run the microprocessor system 240 of FIG. 29 is shown in FIG. 31. As depicted, a true "servo" system operation is designed which returns the plate to the zero or "null" position. The signal from LVDT 196 is monitored and a decision block 256 provides a branch point for determining whether the LVDT 196 output indicates a zero plate displacement. If not, the magnitude of the output is determined, and digitized into the corresponding number of increment or decrement pulses necessary to reposition the plate at zero. This process is indicated in block 258. The adjustment to the plate position is then executed in block 260 by applying the output through I/O port 246, as shown in FIG. 29. In block 262 the force indication is updated and output through I/O port 248 to correct it. In block 264, the accelerometer input received at I/O port 244 is read. In block 266, the LVDT 196 is read at I/O port 242 and at block 268, the accelerometer signal is subtracted from the LVDT signal to provide compensation for vibration in the chute 22. Alternately, this same type of compensation may be provided for velocity with a similar processing of the signals generated by velocity sensing device 230 as shown in FIG. 27. Thus, microprocessor system 240 continuously monitors the LVDT output 196, accelerometer 253 output, and the velocity sensing device 230, processes the data, and generates a corresponding output to maintain the plate at its zero or "null" position, and also provide an indication of the applied force through measuring the restorative force required to maintain the plate 24 at its zero position.

In FIG. 30, still another "true servo" electronic restoring force generating circuit is shown which, in operation, will maintain the plate 24 at its zero position. The electronic circuit includes the LVDT transducer 196, mechanically coupled with actuator rod 34 to the electromagnetic coil 182, similar to that shown in FIG. 27. However, the output of LVDT 196 is passed through a voltage to frequency converter 270 and a voltage polarity sensing circuit 272. The voltage to frequency converter 270 converts the magnitude of the LVDT 196 output into a corresponding pulse stream, and the polarity sensor 272 gives a logical "1" output at either its plus or minus output line, depending upon the sign of the LVDT 196 output. A pair of AND gates 274, 276 receive these outputs, as shown and in turn are connected to an up/down counter 278. Thus, up/down counter 278 is incremented up or down depending upon the sign, and magnitude of the LVDT transducer 196 output, unless the indicated output is zero. Up/down counter 278 provides a series of pulses to the digital to analog converter 280, power amplifier 282 and through the resistor 284 to the electromagnetic coil 182. Resistor 284 corresponds to resistor 180 as shown in FIG. 27 which is used to provide the voltage used to generate an indicated flow rate, or applied force.

Various changes and modifications to this invention would be apparent to one of ordinary skill in the art. These changes are thus included in the scope of the teaching herein, the invention of which is to be limited only by the scope of the claims appended hereto.

What is claimed is:

1. A force transducer for measuring an applied force comprising:
    a surface against which the force to be measured is applied, means to drop a flow of granular material on said surface from a pre-determined height and thereby apply the force to the surface,
    means to support said surface and limit its movement to a substantially linear motion,
    means to generate a restoring force and apply it to the surface in opposition to said force applied thereto, means to measure the velocity of said falling granular material before it leaves the surface and produce a first signal,
    means to measure said restoring force and produce a second signal, and means to combine said first and second signals, said combined signals being thereby an indication of the flow rate of the granular material.

2. The device of claim 1 wherein the restoring force generating and applying means comprises an electronic circuit means, and an electromagnetic force generating means.

3. The device of claim 2 wherein the electronic circuit means includes a programmed microprocessor.

4. The device of claim 2 wherein the electronic circuit means includes a digital electronic circuit.

5. The device of claim 2 wherein the electronic circuit means includes a bridge amplifier having a pair of differential amplifiers.

6. The device of claim 2 wherein the electronic circuit means includes a closed loop feedback amplifier circuit.

7. The device of claim 1 wherein the surface support means has means to permit the surface to deflect from an initial position as the force is applied thereto, the restoring force generating means generating said restoring force in response to said deflection.

8. The device of claim 7 wherein the restoring force generated by the restoring force generating means is greater in response to greater deflections of the surface.

9. The device of claim 8 wherein the force generated by the restoring force generating means is non-linearly related to the magnitude of deflection.

10. The device of claim 7 wherein the restoring force generated by the restoring force generating means is sufficient to return the surface substantially to its initial position.

11. A force transducer for measuring an applied force comprising a surface against which the force to be measured is applied, means to drop a flow of granular material on said surface from a pre-determined height and thereby apply the force to the surface, means to support said surface and limit its movement to a substantially linear motion, means associated with the surface to measure the force applied to the surface by the falling granular material and produce a first signal, means to measure the velocity of said falling granular material prior to its impacting the surface and produce a second signal, and means to combine said first and second signals, said combined signals being thereby an indication of the flow rate of the granular material.

12. The device of claim 11 wherein the speed measuring means is ultrasonic.

13. The device of claim 11 wherein the surface support means has means to limit movement of the surface to substantially a horizontal plane.

14. The device of claim 11 wherein the surface is angled with respect to both the horizontal and vertical planes.

15. A linear force transducer for measuring an applied force comprising:
a surface against which the force to be measured is applied, means to drop a flow of granular material on said surface from a pre-determined height and thereby apply the force to the surface, means to support said surface,
servo means connected to the surface to detect a deflection thereof and generate a restorative force in opposition to the applied force to substantially limit its deflection, means to measure the velocity of said granular material before it leaves the surface and produce a first signal,
means to measure the restorative force and produce a second signal, and means to combine said first and second signals, said combined signals being thereby an indication of the flow rate of the granular material.

16. The transducer of claim 15 wherein the servo means has means to substantially equalize the restorative force with the applied force and thereby balance the surface.

17. The transducer of claim 15 wherein the servo means has means to produce a greater restorative force upon greater deflection of the surface.

18. The transducer of claim 15 wherein the restorative force generated by the servo means is sufficient to return the surface to its initial position.

19. A transducer for measuring the flow rate of a material comprising a surface, a support, means to mount the surface from the support and in the path of the flowing material, said surface mounting means having means permitting deflection thereof in a substantially linear direction in response to the material flowing against said surface, means to generate a variable electromagnetic force resisting said linear deflection, said generated force being variable with respect to the force applied to the surface by the material, means to measure said generated force and produce a first signal indicative thereof, means to measure the speed of the material before it impacts the surface and produce a second signal indicative thereof, and means to combine said first and second signals, the flow rate of the material being determinable therefrom.

20. The transducer of claim 19 wherein the resisting force generating means include means to generate an electrical signal related to the amount of deflection of the surface, amplifier means to amplify said electrical signal, and driver means to transform said amplified electrical signal into said electromagnetic force and apply it to the surface.

21. The transducer of claim 20 further comprising means to increase the gain of said amplifier means in response to an increase in the rate of change of the generated electrical signal.

22. The transducer of claim 20 wherein the driver means comprises a loudspeaker with a cone, the cone of said speaker being separated from its support, and the surface being fixed to the cone.

23. The transducer of claim 20 wherein the driver means includes a magnetic circuit, said magnetic circuit having an air gap, and an electromagnetic armature fixed to the surface and positioned within said air gap.

24. The transducer of claim 19 wherein the surface mounting means has means to define a null position for the surface and includes a pair of spaced springs.

25. The transducer of claim 24 wherein each said space spring is a leaf spring, and further comprising spacer means extending between and mounting the springs.

26. The transducer of claim 25 wherein each leaf spring has a plurality of leaves, each spring having at least one of said leaves secured to the surface, and at least one of said leaves secured to said force generating means.

27. The transducer means of claim 20 further comprising means to display the combined output of said first and second signals, said combined output being directed related to the applied force.

28. The transducer of claim 20 wherein the driver means comprises a pair of solenoids, each solenoid having a movable armature, means mechanically connecting the armatures of said solenoids in opposition, and means mechanically connecting the surface to the armatures so that said solenoids can be energized to apply said electromagnetic force to the surface.

29. The transducer of claim 20 wherein the amplifier means and the driver means has means to generate said electromagnetic force sufficient to return the surface to its initial position.

30. The transducer of claim 20 wherein the amplifier means comprises a programmed microprocessor.

31. The transducer of claim 20 wherein the amplifier means comprises a digital electronic circuit.

32. The transducer of claim 20 wherein the amplifier means comprises a bridge amplifier having a pair of differential amplifiers.

33. The transducer of claim 20 further comprising means to measure the vibration of the support, means to indicate the flow rate of the material in response to said means to combine the first and second signals, and means to adjust said indication means in response to the vibration measuring means.

34. The transducer of claim 20 further comprising means to seal said transducer.

35. The transducer of claim 20 wherein the driver means comprises an electromagnetic coil, said coil having a cylindrical opening extending along its central axis, a core member, suspension means supporting the core member for movement within the cylindrical opening, and means mechanically connecting the core member to the surface.

36. The transducer of claim 35 wherein the core suspension means comprises a pair of spaced springs.

37. The transducer of claim 36 wherein each said spring is a leaf spring, and further comprising means extending between and mounting the springs.

38. The transducer of claim 37 wherein each said leaf spring has a plurality of leaves, each said spring having at least one of its leaves secured to the core, and at least one of its other leaves secured to the coil.

39. In a dry flow sensor having means to measure the flow of falling granular material through a chute, the dry flow sensor having a plate against which the material impacts, the improvement comprising means to automatically compensate the measured flow rate for the speed of the falling material prior to its impacting the plate.

40. The device of claim 39 further comprising means to produce a first signal indicative of the force applied to the plate by the flowing granular material, means to produce a second signal indicative of the instantaneous speed of the granular material, and wherein the speed compensation means includes means to combine said first and second signals.

41. In a dry flow sensor having means to measure the flow of falling granular material through a chute, the dry flow sensor having a plate against which the material imparts a force the improvement comprising means to automatically compensate the measured flow rate for the speed of the falling material prior to its leaving the plate.

42. The device of claim 41 further comprising means to produce a first signal indicative of the force applied to the plate by the flowing granular material, means to produce a second signal indicative of the instantaneous speed of the granular material, and wherein the speed compensation means includes means to combine said first and second signals.

43. A device for measuring the flow rate of falling granular material comprising:
   a surface,
   means to support said surface in the path of the falling granular material,
   means associated with the surface to measure the deflection of the surface from an initial position by the falling granular material, the magnitude of the deflection being directly related to the force exerted against the surface by the falling granular material,
   means to sense the speed of the falling granular material prior to its leaving the surface, and
   means responsive to the deflection measuring means and the speed sensing means to indicate the flow rate of the granular material.

44. The device of claim 43 wherein the surface support means has means to limit movement of the surface to substantially a horizontal plane.

45. A device for measuring the flow rate of granular material through a chute comprising:
   a generally flat plate,
   means mounting said plate at an angle with respect to both horizontal and vertical within the chute and in the path of the granular material, the mounting means having means to support the plate for substantially frictionless motion is a substantially horizontal plane,
   means to drop the grain onto the plate from a pre-determined height,
   a transducer associated with the plate to produce a first signal in response to the force applied to the plate by the granular material,
   means to sense the speed of the granular material before it contacts the plate and produce a second signal in response thereto, and
   means to combine said first and second signals and produce a third signal therefrom, said third signal being an indication of the flow rate of the granular material through the chute.

46. The device of claim 45 wherein the transducer has means to detect deflection of the plate from an initial position, and means to generate and apply a restorative force to the plate, said first signal being responsive to the restoring force generating means.

47. The device of claim 45 wherein the speed sensing means is ultrasonic.

48. A force transducer for measuring an applied force comprising:
   a surface against which the force to be measured is applied,
   means to drop a flow of granular material on said surface from a pre-determined height and thereby apply the force to the surface,
   means to support said surface and limit its movement to a substantially linear motion,
   means associated with the surface to measure the force applied to the surface by the falling granular material and produce a first signal,
   means to measure the velocity of said falling granular material before it leaves the surface and produce a second signal, and
   means to combine said first and second signals, said combined signals being thereby an indication of the flow rate of the granular material.

49. The device of claim 48 wherein the velocity measuring means is ultrasonic.

50. The device of claim 48 wherein the surface support means has means to limit movement of the surface to substantially a horizontal plane.

51. The device of claim 48 wherein the surface is angled with respect to both the horizontal and vertical planes.

52. A device for measuring the flow rate of falling granular material comprising:
   a surface,
   means to support said surface in the path of the falling granular material,
   means associated with the surface to measure the force applied to the surface by the falling granular material,
   means to sense the speed of the falling granular material before it impacts the surface, and
   means responsive to said force measuring means and said speed measuring means to indicate the flow rate of the granular material.

53. The device of claim 52 wherein the speed measuring means is ultrasonic.

54. The device of claim 52 wherein the surface support means has to limit movement of the surface to substantially a linear movement.

55. The device of claim 54 wherein the movement limiting means further comprises means to limit movement of the surface to substantially a horizontal plane.

56. The device of claim 52 further comprising means to drop the granular material from a pre-determined height above the surface.

57. The device of claim 52 wherein the surface is angled with respect to both the horizontal and vertical planes.

58. The device of claim 52 wherein the force measuring means has means to sense the deflection of the surface from an initial position, means to generate and apply a restorative force to the plate, and means to measure the restorative force, said flow rate indication means being responsive to said restorative force measuring means.

* * * * *